United States Patent [19]
Neuner

[11] Patent Number: 6,160,041
[45] Date of Patent: Dec. 12, 2000

[54] NON-CEMENTIOUS CONCRETE-LIKE MATERIAL

[75] Inventor: John D. Neuner, Bay Point, Calif.

[73] Assignee: Hexcel Corporation, Pleasanton, Calif.

[21] Appl. No.: 09/268,756

[22] Filed: Mar. 16, 1999

[51] Int. Cl.$^7$ .................................................. C08L 63/02
[52] U.S. Cl. ........................... 523/440; 523/452; 523/461
[58] Field of Search ..................................... 523/440, 452, 523/461

[56] References Cited

U.S. PATENT DOCUMENTS

| | | | |
|---|---|---|---|
| 3,415,773 | 12/1968 | Collins et al. | 260/38 |
| 4,939,191 | 7/1990 | Kataoka et al. | 524/5 |
| 5,109,088 | 4/1992 | Ohwada et al. | 526/273 |
| 5,461,112 | 10/1995 | Masse et al. | 525/92 |

*Primary Examiner*—Robert Dawson
*Assistant Examiner*—D. Aylward
*Attorney, Agent, or Firm*—W. Mark Bielawski; David J. Oldenkamp

[57] ABSTRACT

A polymer-based blend which may be cured to form a non-cementious concrete-like material. The polymer-based blend includes 90 to 100 parts by weight low viscosity epoxy resin, 1 to 10 parts by weight of an aliphatic glycidyl ether epoxy diluent, 40 to 50 parts by weight polyoxypropyleneamine curing agent, 30 to 100 parts by weight intumescent powder, 90 to 110 parts by weight hollow ceramic microspheres having a density of between 0.30 and 0.60 grams per cubic centimeter and 0.01 to 0.10 part by weight air release agent. The hollow ceramic microspheres are dispersed uniformly throughout the polymer-based blend to provide a non-cementious material which, upon curing, becomes a concrete-like material. The non-cementious concrete-like material is well-suited for use as a substitute for concrete and may be used alone or in combination with reinforcing materials.

30 Claims, No Drawings

NON-CEMENTIOUS CONCRETE-LIKE MATERIAL

BACKGROUND OF THE INVENTION

1. Field of the Invention

The present invention relates generally to materials which are designed to be used as substitutes for concrete. More particularly, the present invention involves non-cementious polymer-based materials which exhibit many of the desirable properties of concrete while at the same time eliminating some of the properties of concrete which are undesirable in certain situations.

2. Description of Related Art

Concrete is one of the most common building materials. It is widely available and is relatively inexpensive. It can be used alone or, more commonly, with some type of reinforcements embedded in the concrete structure. In spite of its popularity, normal concrete does have a number of drawbacks. For example, the compressive strength of normal concrete is only on the order of 3 to 4 kilogram per square inch (ksi) and the tensile strength is around only 0.3 ksi. In addition, the relatively high density of concrete (2.3 grams per cubic centimeter) makes it too heavy for many applications where light weight and structurally strong building materials are required.

Polymers have been used as additives to enhance various properties of concrete. These cement-based compositions include varying amounts of polymer additives which are included in the concrete mixture to improve properties such as plasticity and adhesion. For example, see U.S. Pat. Nos. 5,109,088; 4,939,191; and 3,415,773 wherein various cement-polymer compositions are described. In addition, there has been interest in producing non-cementious (i.e. cement-free) materials which may be used in place of concrete. For example, polymer-based materials which have been proposed as non-cementious replacements for concrete are described in U.S. Pat. Nos. 5,461,112.

There are a few problems among the many advantages of using polymer-based materials in place of concrete. For example, many polymers will burn if they are not specially treated. This is a significant drawback when compared to concrete structures which are fireproof. In addition, most polymer blends cure exothermically. As a result, it is difficult to cast many large polymeric structures without causing rapid and uncontrollable heat release which causes rapid and uncontrollable curing that may result in thermal damage or fire. Concrete, on the other hand, may be cast in massive structures which cure relatively slowly with only a minimum amount of heat release. In addition, concrete is relatively slow curing so that relatively large structures may be formed in one pouring.

In view of the above, there is a present and continuing need to develop non-cementious concrete-like materials which are fire resistant and have greater mechanical properties than concrete. Further, such concrete-like materials should be capable of being cast and cured as large structures without uncontrollable exotherms.

SUMMARY OF THE INVENTION

In accordance with the present invention, it was discovered that a special type of polymer-based blend may be made which can be cured to form a non-cementious concrete-like material. The polymer-based blend of the present invention may be cast to form structures which are up to nine inches thick without the exothermic problems associated with polymer materials. The resulting non-cementious concrete-like material has tensile and compressive strengths which are much greater than concrete. In addition, the cured polymer-based blend of the present invention is fire resistant and will not burn even when subjected to a direct flame, such as a propane torch. The flame goes out almost immediately after removal of the heat source from the cured polymer-based blend. Further, an intumescent char layer is formed which further insulates the cured polymer-based blend from further burning.

The present invention is based on the further discovery that certain types of filler materials may be incorporated into the polymer-based blend wherein the fillers are uniformly distributed throughout the blend to form an isotropic material which exhibits uniform structural properties. The cured polymer-based blend in accordance with the present invention forms a non-cementious concrete-like material which may be used as a substitute for concrete as a building material.

The polymer-based blends include 90 to 100 parts by weight of a low viscosity epoxy resin which is mixed with 1 to 10 parts by weight of an aliphatic glycidyl ether epoxy diluent to form a polymer blend. This polymer blend is further mixed with 30 to 100 parts by weight of an intumescent powder, 10 to 20 parts by weight hollow ceramic microspheres having a density of between 0.30 and 0.60 grams per cubic centimeter, and 0.01 to 0.10 part by weight air release agent, wherein the hollow ceramic microspheres are dispersed uniformly throughout the polymer-based blend. The blend further includes 40 to 50 parts by weight polyoxypropyleneamine curing agent. It was discovered that this particular curing agent when used in combination with the polymer blend provides relatively slow cure times. In addition, use of this curing agent allows the polymer-based blend to be cast in forms up to nine inches thick without the problems associated with uncontrollable exotherms.

As a feature of the present invention, the low viscosity epoxy resin may be a diglycidyl ether or bis phenol A epoxy resin having a viscosity of between 6,500 and 9,500 centipoise (cps). As a further feature, the aliphatic glycidyl ether epoxy diluent will have a viscosity of between 5–15 centipoise. As additional features of the present invention, certain commercially-available intumescent powder, hollow ceramic microspheres and air release agents were found to be especially well-suited for preparing polymer-based blends which, when cured, form non-cementious concrete-like materials which are suitable for use as a substitute for concrete.

The polymer-based blends in accordance with the present invention may be used alone or in combination with reinforcement materials such as metal, glass fiber and carbon fiber to form a wide variety of structures which have conventionally been made with concrete. The materials used in the present polymer-based blend are relatively inexpensive and provide a thermoset material which is isotropic and has compressive strengths on the order of 7 ksi and up. In addition, tensile strengths for the non-cementious cement-like material are on the order of 1.5 ksi and up. The densities of the cured polymer-based blends are between about 0.8 to 2.0 grams per cubic centimeter.

The above-discussed and many other features and attendant advantages of the present invention will become better understood by reference to the following detailed description.

DETAILED DESCRIPTION OF THE INVENTION

The present invention covers polymer-based blends which may be cured to form non-cementious concrete-like materials. The polymer blend has an overall consistency which is similar to concrete in that it may be pumped or transported using conventional concrete pumps and auger-type mixers. The polymer blend may be cast in single pours to form structures which are relatively large, i.e., on the order of nine inches thick and greater. The cure time for the polymer blend is on the order of 10 to 30 hours so that relatively large structures may be formed in one pouring. In addition, the various fillers which are used in the polymer blend do not settle out or otherwise become segregated within the polymer blend. The polymer blend may be used as a substitute for concrete in a wide variety of structures which utilize concrete as a principal material. The polymer blend may be cured alone or in combination with reinforcing materials. Exemplary reinforcing materials include metals, such as steel, iron and aluminum. Other reinforcing materials include glass fibers, carbon fibers, ceramic fibers, such as silicon carbide fibers and plastic fibers, such as aramid fibers and polypropylene fibers. The fibers may be used in a wide variety of configurations including strands, unidirectional or woven fibers and even chopped fibers.

The basic polymer-based blend in accordance with the present invention includes:

- 90 to 100 parts by weight low viscosity epoxy resin;
- 1 to 10 parts by weight of an aliphatic glycidyl ether epoxy diluent;
- 40 to 50 parts by weight polyoxypropyleneamine curing agent;
- 30 to 100 parts by weight intumescent powder;
- 90 to 110 parts by weight hollow ceramic microspheres, having a density of between 0.30 and 0.60 grams per cubic centimeter; and 0.01 to 0.10 part by weight air release agent.

The above components are blended together to form a mixture having the consistency of honey in which the hollow ceramic microspheres are dispersed uniformly throughout the mixture. It is preferred that the epoxy resin and epoxy diluent be mixed first to form a polymer blend. The remaining ingredients are then added to the polymer blend, preferably in the order listed above. However, the order of adding ingredients to the polymer blend is not particularly critical.

The preferred amount of low viscosity epoxy resin in the polymer blend is 95 parts by weight plus or minus 2. The low viscosity epoxy resin is preferably a diglycidyl ether or bis phenol A epoxy resin which has a viscosity on the order of 6,500 to 9,500 centipoise (cps). It should be noted that all of the viscosities set forth in this specification are measured at 25° C. Exemplary low viscosity epoxy resins include GY6008 which is available from Ciba Specialty Chemicals Corp. (Brewster, N.Y.). Other suitable low viscosity epoxy resins include: 1) EPON 828 which is available from Shell Chemical Company (Houston, Tex.); 2) DER 332 which is available from Dow Chemical Company (Midland, Mich.); and 3) Epotuf 37–139 which is available from Reichold Corp. (Research Triangle Park, N.C.).

The preferred amount of aliphatic glycidyl ether epoxy diluent is 5 parts by weight, plus or minus 2 parts by weight. The epoxy diluent should have a viscosity of 5 to 15 cps. Exemplary epoxy diluents include GY025 which is available from Ciba Specialty Chemicals Corp. (Brewster, N.Y.). Other exemplary epoxy diluents include: 1) Araldite DY023, DY027, RD-1 and RD-2 which are available from Ciba Specialty Chemicals Corp. (Brewster, N.Y.); 2) Heloxy modifier 7, 8, 61, 62, 67 and 68, Epirez 501, 511, 5018 and 5022 which are all available from Shell Chemical Corp. (Houston, Tex.); 3) Epodil 741, 742, 750 and 757 which are available from Air Products Corp. (Allentown, Pennsylvania); and 4) Epotuf 37–052, 37–053, and 37–057 which are available from Reichold Corp. (Research Triangle Park, N.C.).

The amount of polyoxypropyleneamine curing agent is preferably about 44 parts by weight, plus or minus 2. An exemplary polyoxypropy-leneamine curing agent is available from Huntsman Corp. (Conroe, Tex.) under the tradename JEFFAMINE T403. This curing agent provides a polymer blend which has an unusually long potlife for a blend utilizing an epoxy converter. Other exemplary polyoxypropyleneamine curing agents include Jeffamine D230 which is available from Huntsman Corp. (Conroe, Tex.).

The amount of intumescent powder is preferably about 48 parts by weight, plus or minus 2. Most intumescent powders or blends are proprietary mixtures which are commercially available. A preferred exemplary intumescent powder is available from Fire and Thermal Protection Engineers (Evansville, Ind.) under the tradename ITP2901. Other exemplary intumescent powders include but are not limited to proprietary mixtures of ammonium polyphosphate, melamine pyrophosphate, melamine cyanurate and di or monopentaerythritol.

The amount of hollow ceramic microspheres in the polymer blend is preferably between 90 and 110 parts by weight, plus or minus 2 parts by weight. The hollow ceramic microspheres preferably have a density of about 0.50, plus or minus .05 gram per cubic centimeter. Exemplary hollow ceramic microspheres are available from Zeelan Industries (St. Paul, Minn.) under the tradename Z-LIGHT spheres type G3500. Other exemplary hollow ceramic microspheres which may be used in accordance with the present invention include grades 500 or 300W hollow ceramic microspheres which are available from Trelleborg Fillite, Inc. (Norcross, Ga.).

The last required ingredient for the polymer-based blend is an air release agent which is preferably present in an amount of about 0.05 parts by weight, plus or minus 0.02 parts by weight. An exemplary air release agent is available from Kenrich Petrochemicals (Bayonne, N.J.) under the tradename KEN REACT KR TTS. Other exemplary air release agents include Byk A501 or A500 which is available from Byk Chemie (Wallingford, Conn.).

In order to produce a non-cementious concrete-like material which has uniform properties, it is desirable that the hollow ceramic microspheres be dispersed uniformly throughout the polymer-based blend. Hollow ceramic microspheres having densities of between 0.30 and 0.60 grams per cubic centimeter were found to be especially well-suited for uniform disbursal throughout the polymer blend. Further, it was discovered that such ceramic microspheres, even though they have a density substantially different from the basic polymer blend, do not settle out unevenly after mixing or during curing of the polymer blend.

An exemplary polymer-based blend in accordance with the present invention was made utilizing the following formulation:

| | |
|---|---|
| GY6008 | 95 parts by weight |
| GY025 | 5 parts by weight |
| JEFFAMINE T403 | 43.7 parts by weight |
| KRTTS | 0.06 parts by weight |
| ITP2901 | 47.7 parts by weight |
| G3500 | 104 parts by weight |

The above ingredients were mixed together in the order set forth above at room temperature. The amount of resin prepared was sufficient to fill a two inch radius by four inch high round cylinder. The mixture was allowed to cure at room temperature for 48 hours. The compressive strength of the cylinder was 7.7 ksi, with the tensile strength being about 1.8 ksi.

A number of polymer blends were made following the basic formulation above, except that different filler materials were substituted for the G3500 hollow ceramic microspheres. For example, ZEEOSPHERES type G-800 were substituted for the hollow ceramic microspheres to provide the following formulation:

| GY6008 | 95 parts by weight |
| DY025 | 5 parts by weight |
| T403 | 43.5 parts by weight |
| ITP 2901 | 35 parts by weight |
| ZEEOSPHERES G-800 | 281 parts by weight |
| KRTTS | .06 parts by weight |

ZEEOSPHERES G-800 are solid ceramic microspheres which are available from Zeelan Industries (St. Paul, Minn.). The solid ceramic ZEEOSPHERES have a compressive strength of over 60 ksi. This compares to hollow microspheres which have a compressive strength of only 2 ksi. However, the compressive strength of the resulting cured polymer blend was found to be only 9.4 ksi versus 7.7 ksi for the polymer based blends of the present invention.

A number of polymer blends were also prepared in which lightweight aggregates of various sizes were substituted for the hollow ceramic micro-spheres as set forth in Table 1 (Formulations B-E).

The lightweight aggregates are available from Tufflite, Inc. (Phoenix, Ariz.) under the tradename TUFFLITES. The polymer blends made with TUFFLITES were not suitable because all of the aggregate settled out during cure. This made the castings non uniform. Also, undesirable bubbles formed on the top of castings. The same problem was experienced when RECYCLOSPHERES were substituted for the G3500 hollow ceramic microspheres. RECYCLOSPHERES are made from recycled rubber particles (see Table 1—Formulation A).

TABLE 1

| | Formulations (Parts by Weight) | | | | |
|---|---|---|---|---|---|
| Ingredients | A | B | C | D | E |
| GY6008 | 95 | 95 | 95 | 95 | 95 |
| DY025 | 5 | 5 | 5 | 5 | 5 |
| T403 | 43.5 | 43.5 | 43.5 | 43.5 | 43.5 |
| ITP 2901 | 35 | 35 | 35 | 35 | 35 |
| Recyclospheres LV01-SG | 74 | | | | |
| KRTTS | .06 | .06 | .06 | .06 | .06 |
| Tufflite 5/16" | | 121 | | | |
| Tufflite 3/16" | | | 114.5 | | |
| Tufflite 3/8" minus | | | | 214 | |
| Tufflite 1/18" minus | | | | | 145 |

In another comparative example, hollow ceramic microspheres having a density of 0.06 were substituted for the G3500 microspheres (see Table 2—Formulation F). The low-density hollow ceramic spheres are marketed under the tradename DUALITES by Pierce & Stevens Corporation (Buffalo, N.Y.). The DUALITES microspheres were not suitable since they also did not remain uniformly dispersed within the polymer blend.

TABLE 2

| | Formulations (Parts by Weight) | | | |
|---|---|---|---|---|
| Ingredients | F | G | H | I |
| GY6008 | 95 | 95 | 95 | 95 |
| DY025 | 5 | 5 | 5 | 5 |
| T403 | 43.5 | 43.5 | 43.5 | 43.5 |
| ITP 2901 | 35 | 35 | 35 | 35 |
| KRTTS | .06 | .06 | .06 | .06 |
| Dualite M7002 | 7.43 | | | |
| Silbrico #6 STP | | 33.1 | | |
| Tufflite 3/8" minus | | | 146 | 132 |
| Z-Light Spheres Type 3500 | | | 30 | 38 |

Another comparative polymer blend was made in which a perlite was substituted in place of the G3500 microspheres (see Table 2—Formulation G). The particular perlite used is available from Silbrico Corp. (Hodgkins, Ill.) under the tradename SILBRICOS #6 STP. This perlite, which has a density of between 0.06 and 0.13, was found not to be suitable since compressive strengths of the castings were only about 3 ksi.

In additional comparative examples, G3500 microspheres were mixed with TUFFLITE microspheres. See Table 2 —Formulations H and I. A substantial amount of the aggregate settled out during cure. This resulted in a non-uniform casting.

The preferred ratio of low viscosity epoxy resin to aliphatic glycidyl ether epoxy diluent was determined by preparing unfilled, non-flame retardant castings. The castings were cut in half. One half was cured at room temperature and the other half was subjected to 200° F. for one hour post-cure to simulate full cure in the sun. The glass transition temperature (Tg) was measured for each fully cured casting. The formulations and results are set forth in Table 3.

TABLE 3

| | Resin Ingredients (Parts by Weight) | | | |
|---|---|---|---|---|
| Ingredients | AA | BB | CC | DD |
| GY6008 | 95 | 95 | 90 | 90 |
| DY025 | 5 | 5 | 10 | 10 |
| T403 | 43.5 | 47.4 | 42.7 | 46.5 |
| Tg (Rm Temp Cure) | 67° C. | 60° C. | 60° C. | 56° C. |
| Tg (200° F.) Post Cure | 81° C. | 85° C. | 68° C. | 71° C. |

The preferred resin mix based on the above Tg results was 95 parts by weight low viscosity epoxy resin and 5 parts by weight aliphatic glycidyl ether epoxy diluent. Resin mixes of 90 parts by weight low viscosity epoxy resin and 10 parts by weight aliphatic glycidyl ether epoxy diluent are acceptable. However, the Tg may be too low for some outside environments.

The preferred amounts of intumescent material (flame retardant) were established by making castings having the formulations set forth in Table 4.

TABLE 4

| | Intumescent Material Levels | | |
|---|---|---|---|
| Ingredients | Resin Ingredients (Parts by Weight) | | |
| | J | K | L |
| GY6008 | 95 | 95 | 95 |
| DY025 | 5 | 5 | 5 |
| T403 | 43.5 | 43.5 | 43.5 |

TABLE 4-continued

Intumescent Material Levels

| Ingredients | Resin Ingredients (Parts by Weight) | | | |
|---|---|---|---|---|
| ITP 2901 | 47.7 | 86.1 | 143.5 | |
| | M | N | O | P |
| GY6008 | 95 | 95 | 95 | 95 |
| DY025 | 5 | 5 | 5 | 5 |
| T403 | 43.5 | 43.5 | 43.5 | 43.5 |
| ITP 2901 | 86.1 | 47.7 | | 35 |
| Z-Light Spheres G3500 | 85.4 | 104 | 129 | 125 |
| KRTTS | .06 | .06 | .06 | .06 |

Formulations J, K and L did not include any hollow microspheres. The castings made from Formulations J, K and L were tested for flammability by placing a flame from a cigarette lighter underneath the castings for 10 seconds and then releasing the flame. Castings K and L were found to be immediately self extinguishing while casting J took between 1 and 5 seconds to self extinguish after the flame was removed.

Formulations M, N, O and P were then prepared in which hollow ceramic microspheres (Z-LIGHT G3500) were included in the formulations. The flammability of castings made from these formulations was tested by placing the castings under a propane torch for 10 seconds and then releasing the flame. Casting O did not have any intumescent material and continued to burn with a black sooty flame after the propane flame was released. Casting P immediately self extinguished. However, casting P had low compressive strength (5.4 psi).

Both castings M and N included ingredients at levels in accordance with the present invention. Both castings were self extinguishing while still having acceptable compressive strength relative to concrete and the consistency (pourability or pumpability) of concrete. Further, there was no settling of the filler and bubbles did not form on top of either the M or N castings. Castings M and N have Tg's which are also acceptable (i.e., Tg's are above 60° C.). Formulation N is preferred because it is more economical to manufacture due to the lesser amount of the ITP 2901 intumescent material required. Even though the other castings described earlier with flame retardant and different fillers had similar burn characteristics to M and N, they were not acceptable in accordance with the present invention because of filler settling, bubbles on top, low compressive strengths relative to concrete or combinations thereof.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A polymer-based blend comprising:

90 to 100 parts by weight low viscosity epoxy resin;

1 to 10 parts by weight of an aliphatic glycidyl ether epoxy diluent, wherein said diluent has a viscosity which is lower than the viscosity of said low viscosity epoxy resin;

40 to 50 parts by weight polyoxypropyleneamine curing agent;

30 to 100 parts by weight intumescent powder;

90 to 110 parts by weight hollow ceramic microspheres having a density of between 0.30 and 0.60 grams per cubic centimeter; and 0.01 to 0.10 part by weight air release agent wherein said hollow ceramic microspheres are dispersed uniformly throughout said polymer-based blend.

2. A polymer-based blend according to claim 1 wherein said low viscosity epoxy resin consists essentially of diglycidyl ether of bis-phenol A resin having a viscosity of between 6500 and 9500 centipoise.

3. A polymer-based blend according to claim 2 wherein said aliphatic glycidyl ether epoxy diluent has a viscosity of between 5–15 centipoise.

4. A polymer-based blend according to claim 1 wherein said intumescent powder is manufactured by Fire and Thermal Protection Engineers and identified as ITP 2901 intumescent powder.

5. A polymer-based blend according to claim 1 wherein said polyoxypropyleneamine curing agent is manufactured by Huntsman Corporation and is identified as JEFFAMINE T403.

6. A polymer-based blend according to claim 1 wherein said hollow ceramic microspheres are manufactured by Zeelan Industries and identified as Z-LIGHT type G3500 microspheres.

7. A polymer-based blend according to claim 1 wherein said air release agent is manufactured by Kenrich Petrochemicals and identified as KENREACT type KR TTS air release agent.

8. A polymer-based blend according to claim 1 wherein said intumescent powder is manufactured by Fire and Thermal Protection Engineers and identified as ITP 2901 intumescent powder, said polyoxypropyleneamine curing agent is manufactured by Huntsman Corporation and is identified as JEFFAMINE T403, said hollow ceramic microspheres are manufactured by Zeelan Industries and identified as Z-LIGHT type G3500 microspheres and said air release agent is manufactured by Kenrich Petrochemicals and identified as KENREACT type KR TTS air release agent.

9. A polymer-based blend according to claim 8 which consists essentially of:

95 parts by weight diglycidyl ether of bis-phenol A epoxy resin having a viscosity of between 6500 and 9500;

5 parts by weight aliphatic glycidyl ether epoxy diluent having a density of between 5 and 15 centipoise;

44 parts by weight polyoxvpropyleneamine curing agent which is manufactured by Huntsman Corporation and identified as JEFFAMINE T403;

48 parts by weight intumescent powder which is manufactured by Fire and Thermal Protection Engineers and identified as ITP 2901 intumescent powder;

14 parts by weight hollow ceramic microspheres which are manufactured by Zeelan Industries and identified as Z-LIGHT type G3500 microspheres; and 0.06 part by weight air release agent which is manufactured by Kenrich Petrochemicals and identified as KENREACT type KR TTS air release agent.

10. A polymer-based blend according to claim 1 which has been cured to form a material that has a density of between 0.8 and 2.0 grams per cubic centimeter.

11. A cured material according to claim 10 which further comprises reinforcement material selected from the group consisting of metal, glass fiber, carbon fiber, ceramic fiber and plastic fiber.

12. A polymer-based blend according to claim 2 which has been cured to form a material that has a density of between 0.8 and 2.0 grams per cubic centimeter.

13. A polymer-based blend according to claim 12 which further comprises reinforcement material selected from the group consisting of metal, glass fiber, carbon fiber, ceramic fiber and plastic fiber.

14. A polymer-based blend according to claim 3 which has been cured to form a material that has a density of between 0.8 and 2.0 grams per cubic centimeter.

15. A cured material according to claim 14 which further comprises reinforcement material selected from the group consisting of metal, glass fiber, carbon fiber, ceramic fiber and plastic fiber.

16. A polymer-based blend according to claim 4 which has been cured to form a material that has a density of between 0.8 and 2.0 grams per cubic centimeter.

17. A cured material according to claim 16 which further comprises reinforcement material selected from the group consisting of metal, glass fiber, carbon fiber, ceramic fiber and plastic fiber.

18. A polymer-based blend according to claim 5 which has been cured to form a material that has a density of between 0.8 and 2.0 grams per cubic centimeter.

19. A cured material according to claim 18 which further comprises reinforcement material selected from the group consisting of metal, glass fiber, carbon fiber, ceramic fiber and plastic fiber.

20. A polymer-based blend according to claim 6 which has been cured to form a material that has a density of between 0.8 and 2.0 grams per cubic centimeter.

21. A cured material according to claim 20 which further comprises reinforcement material selected from the group consisting of metal, glass fiber, carbon fiber, ceramic fiber and plastic fiber.

22. A polymer-based blend according to claim 7 which has been cured to form a material that has a density of between 0.8 and 2.0 grams per cubic centimeter.

23. A cured material according to claim 22 which further comprises reinforcement material selected from the group consisting of metal, glass fiber, carbon fiber, ceramic fiber and plastic fiber.

24. A polymer-based blend according to claim 8 which has been cured to form a material that has a density of between 0.8 and 2.0 grams per cubic centimeter.

25. A according to claim 24 which further comprises reinforcement material selected from the group consisting of metal, glass fiber, carbon fiber, ceramic fiber and plastic fiber.

26. A polymer-based blend according to claim 9 which has been cured to form a material that has a density of between 0.8 and 2.0 grams per cubic centimeter.

27. A cured material according to claim 26 which further comprises reinforcement material selected from the group consisting of metal, glass fiber, carbon fiber, ceramic fiber and plastic fiber.

28. A method for making a polymer-based blend comprising the steps of:

mixing 90 to 100 parts by weight low viscosity epoxy resin with 1 to 10 parts by weight of an aliphatic glycidyl ether epoxy diluent, wherein said diluent has a viscosity which is lower than the viscosity of said low viscosity epoxy resin to form an epoxy blend and mixing said epoxy blend with 40 to 50 parts by weight polyoxypropyleneamine curing agent, 30 to 100 parts by weight intumescent powder, 10 to 20 parts by weight hollow ceramic microspheres having a density of between 0.30 and 0.60 grams per cubic centimeter and 0.01 to 0.10 part by weight air release agent to form said polymer-based blend wherein said hollow ceramic microspheres are dispersed uniformly throughout said polymer-based blend.

29. A method according to claim 28 which includes the step of curing said polymer-based blend to form a thermoset material.

30. A method according to claim 29 which includes the step of combining said polymer-based blend with a reinforcement material prior to said curing step wherein said reinforcement material is selected from the group consisting of metal, glass fibers, carbon fiber, ceramic fiber and plastic fiber.

* * * * *